(12) United States Patent
Ducaule et al.

(10) Patent No.: US 12,141,156 B2
(45) Date of Patent: Nov. 12, 2024

(54) UNIFIED DATA ACCESS AND QUERYING

(71) Applicant: SAP SE, Walldorf (DE)

(72) Inventors: Sebastien Ducaule, Levallois Perret (FR); Raphael Geoffroy, Colombes (FR)

(73) Assignee: SAP SE, Walldorf (DE)

( * ) Notice: Subject to any disclaimer, the term of this patent is extended or adjusted under 35 U.S.C. 154(b) by 7 days.

(21) Appl. No.: 18/076,768

(22) Filed: Dec. 7, 2022

(65) Prior Publication Data

US 2024/0193170 A1    Jun. 13, 2024

(51) Int. Cl.
| | | |
|---|---|---|
| *G06F 17/00* | (2019.01) | |
| *G06F 7/00* | (2006.01) | |
| *G06F 16/2453* | (2019.01) | |
| *G06F 16/2455* | (2019.01) | |
| *G06F 16/248* | (2019.01) | |

(52) U.S. Cl.
CPC ...... *G06F 16/248* (2019.01); *G06F 16/24537* (2019.01); *G06F 16/24542* (2019.01); *G06F 16/24553* (2019.01)

(58) Field of Classification Search
CPC ............. G06F 16/248; G06F 16/24537; G06F 16/24553; G06F 16/24542
USPC ....................................................... 707/718
See application file for complete search history.

(56) References Cited

U.S. PATENT DOCUMENTS

| | | | |
|---|---|---|---|
| 7,337,163 B1 * | 2/2008 | Srinivasan | G06F 16/2453 707/999.102 |
| 11,386,185 B2 | 7/2022 | Geoffroy et al. | |
| 2004/0015783 A1 * | 1/2004 | Lennon | G06F 16/258 715/255 |
| 2004/0153441 A1 * | 8/2004 | Dettinger | G06F 16/2471 707/999.003 |
| 2004/0181543 A1 * | 9/2004 | Wu | G06F 16/90328 707/999.102 |
| 2010/0223256 A1 * | 9/2010 | Chalana | G06F 16/24539 707/718 |

OTHER PUBLICATIONS

Blogs.sap.com [online], "SAP BI 4.3 SP2: What's New in Web Intelligence and Semantic Layer" Dec. 8, 2021, retrieved on Nov. 22, 2022, retrieved from URL <https://blogs.sap.com/2021/12/08/sap-bi-4.3-sp2-whats-new-in-web-intelligence-and-semantic-layer/#PRES>, 59 pages.

* cited by examiner

*Primary Examiner* — Pavan Mamillapalli
(74) *Attorney, Agent, or Firm* — Fish & Richardson P.C.

(57) ABSTRACT

The present disclosure relates to computer-implemented methods, software, and systems for generating intelligent data reports based on data of different data source type(s). Metadata is obtained from data sources to support querying. A request is received by the compound database and from a query panel to generate a report associated with at least one data source. The request includes one or more data manipulation operations, wherein at least one of the data manipulation operations is not natively supported by a data source of the at least one data source. A query is generated based on the request. The query is split based on a number of data sources associated with the request to generate the report. The query is transformed into at least one sub-queries corresponding to each of the at least one data source and a report is generated based on their execution.

20 Claims, 6 Drawing Sheets

UNIFIED DATA ACCESS AND QUERYING

TECHNICAL FIELD

The present disclosure relates to computer-implemented methods, software, and systems for data processing.

BACKGROUND

Software complexity is increasing and causes changes to lifecycle management and maintenance of software applications, databases, and platform systems. Customers' needs are transforming and imposing higher requirements for process execution, lifecycle management, and technical landscapes that also support high-availability to access software resources provided by an underlying platform.

SUMMARY

Implementations of the present disclosure are generally directed to a computer-implemented method for generating intelligent data reports based on data of different data source type(s).

One example method may include operations such as obtaining, by a compound database, metadata from data sources to support querying the data sources to generate reports based on unified data manipulation over data from the data sources, wherein each data source of the data sources is of a respective data source type and associated with a different respective set of query execution capabilities from a plurality of query execution capabilities, wherein a query execution capability for a data source defines one or more data manipulation operations that are supported by the data source and a respective data source type; receiving a request, by the compound database and from a query panel, to generate a report that is associated with at least one data source, wherein the request includes a data model for the report including one or more data manipulation operations to be performed over data of the at least one data source, wherein at least one of the data manipulation operations is not natively supported by a data source of the at least one data source; and generating, as a generated query, a query based on the request to obtain data from the at least one data source to generate the report, wherein generating the query includes: splitting the query based on a number of data sources of the at least one data source associated with the request to generate the report; transforming the query into at least one sub-queries corresponding to each of the at least one data source, wherein a sub-query is defined based on a data source type of a respective data source and a data manipulation operation that is included in the request, wherein at least one data manipulation operations of the one or more data manipulation operations included in the request is not-supported by a data source of the at least one data source associated with the request to generate the report; and generating the report based on executing the query through the compound database at the at least one data source.

In some instances, obtaining metadata from data sources includes: obtaining the metadata based on data source interfaces implemented at the data sources and data access interfaces implemented at data access components. In some instances, a data access component can connect a respective data source to the compound database and defines an execution of a sub-query of the at least one sub-queries according to a specification for transforming the query for a respective data source type matching the data source type of a respective data source.

In some instances, obtaining metadata from data sources includes: obtaining metadata from a data source from the data sources through an interface implemented at the data source, wherein the interface processes a request to obtain respective metadata when executing a sub-query generated based on the query, where the sub-query is defined to query the data source for relevant data based on available metadata for the data source.

In some instances, each of the data sources is associated with a respective data access component for managing connections, access rights, and generation of sub-queries matching a respective data source type of a data source, and wherein the method comprising: implementing a data source interface for each of the data sources and a data access interface for each respective data access component, wherein data source interfaces are implemented to provide the metadata that is obtained by the compound database and is usable to create a custom metadata layer at the compound database that is configured to communicate with a specification generation component of the data access interface to define a sub-query for executing at the data source.

In some instances, the method may include that in response to obtaining metadata from data sources, a custom metadata layer is created to generate a specification for executing queries through the compound database. The custom metadata layer supports the compound database to provide a unified set of query execution capabilities for each of the data sources. In response to executing a sub-query of the query based on the specification at a first data source, obtaining first data from the first data sources to generate the report based on the data model included in the request to generate the report and a first data manipulation operation of the at least one of the data manipulation operations, the first data manipulation operation being associated with the first data source and being not supported by the data source for native execution.

In some instances, each of the data sources can be associated with a respective data access component for managing connections and access rights. A first data access component includes logic for defining a query statement for execution at a first, corresponding data source, wherein the logic at the first data access component is for transforming the generated query to a sub-query that matches the request for the report and the data model of the report. Based on executing the sub-query at the first, corresponding data source through the first data access component, first data is obtained that allows for executing a data manipulation operation of the at least one data manipulation operations that is not natively supported by the first, corresponding data source.

In some instances, the query is generated as a tree of queries combined with operators to obtain the data from the at least one data source, and wherein a query from the tree of queries is transformed to a sub-query.

In some instances, a first sub-query of the at least one sub-queries that is associated with a first data source is generated based on transforming the query based on a specification for transforming at least a portion of the query according to the data source type of the first data source.

In some instances, executing the query through the compound database includes: executing a calculation plan on top of the data from the at least one data source based on transmitting get data messages from a calculation engine to the compound database to aggregate and merge the data from the at least one data source according to a data flow merge operation.

In some instances, the compound database is coupled to the data sources and is configured to maintain data source connections to the data sources.

In some instances, the method can include obtaining data for query execution capabilities provided by each of the data sources, wherein the query execution capabilities define data manipulation operations and/or query functionalities supported by each of the data sources.

In some instances, the report can be stored in a report repository.

In some instances, the data sources can include one or more of an EXCEL file, a text file, a comma-separated value (CSV) file, an open data protocol (OData) data source, a universe, and a relational database.

In some instances, the method can include: receiving a refresh request to refresh the generated report; and in response to receiving the refresh request, executing at least one sub-query at the at least one data source to generate a refreshed report that is based on available data at the at least one data source at a time point of execution.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description, drawings, and the claims.

DETAILED DESCRIPTION

Figure 1:
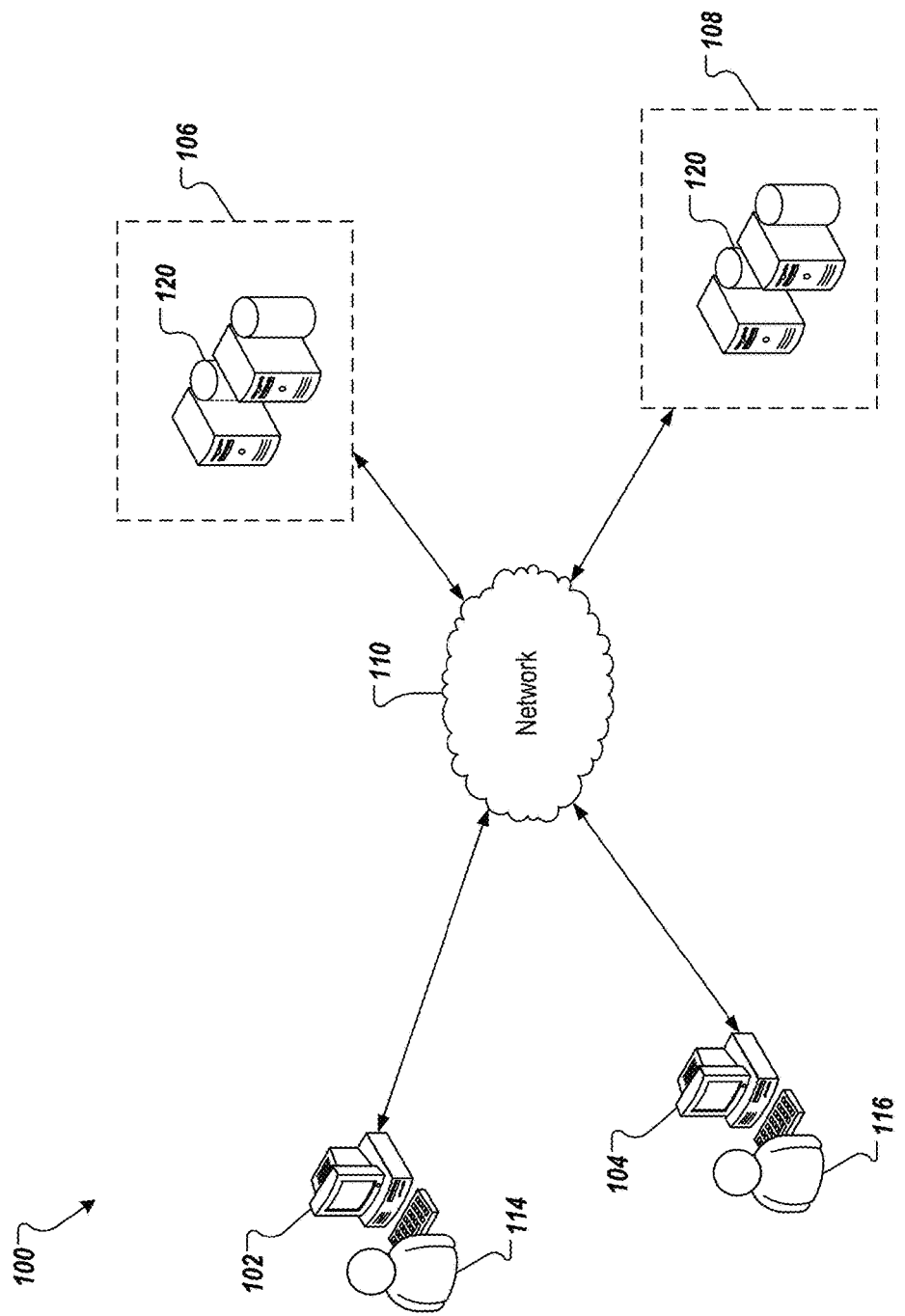
FIG. 1 is a block diagram depicting an example computer-implemented system that can execute implementations of the present disclosure in accordance with implementations of the present disclosure.

The present disclosure describes various tools and techniques for generating intelligent data reports based on data of different data source type(s).

A Web Intelligence (WebI) information platform and tools may support different use cases to perform queries over data and to generate report. With ad-hoc queries and analysis use cases, data within a resource (for example, a web intelligence (WebI) document, or an open data protocol (OData) document) can be queried and aggregated to generate a report based on a requested report data model. In some instances, a resource (for example, a database source, a source file, a table, a universe data source, WebI report, or other type of a data source) may be desired to be used to generate a report based on data manipulation operations that are not supported by the resource. For example, a source file can be a comma-separated value (CSV) file storing data for sales executions over a time horizon, where the CSV file format does not support filtering operation but rather supports direct reading. Thus, if a report is requested to be generated based on data from the CSV file, where the report requires that filtering is executed over the data, direct data querying and manipulation (such as, aggregation) may not be executed at the source file directly. A CSV file does not natively support filtering operations, and if filtering is requested to be executed, such filtering cannot be executed on data source level. In some instances, to support execution of filtering without modifying the CSV file and without modifying an original query request that includes operations not supported by the CSV file, data part of the CSV file can be processed in a way that a portion of the data is extracted from the CSV file during reading the file and filtering operations are performed on top of that portion of the data in an execution framework that supports filtering outside of the CSV file and in a middle layer that connects the querying functionality with the data maintenance capabilities.

In some instances, reports can be generated based on data from one or more data sources and according to a predefined set of data manipulation operations. In some instances, a data source may support different data manipulation operations natively, and the execution of the data manipulation operations that are not natively supported by a data source can be performed based on an extraction of data from the data source according to a defined query execution plan that supports the subsequent execution of the data manipulation operation outside of the data source technology stack. In some instances, extracted data from data sources can further undergo data manipulations such as aggregation based on data extraction, transformation, and loading techniques.

In some instances, a WebI tool and/or platform can support querying techniques that allow data manipulations based on data from different data sources that can have different data source types. For example, reports can be generated based on one or more data sources of data types such as, universe, text file format, EXCEL file format, Free Hand structured query language (SQL), or OData, among other examples. In some instances, the WebI tool and/or platform can provide capabilities to integrate data from different data source types. The report querying functionality can support unified querying of data sources that can be agnostic to the underlying querying capabilities of the data sources. In some instances, the universe data source can be a data source type that provides all of the query capabilities of the other data source types. Thus, the universe data source can be the data source type that is most powerful to be used for executing queries for reports. In some instances, a universe can be defined as an abstraction of a data source to which it is connected and presents data for objects from that data source to users in non-technical terms that allows for easy and flexible data manipulation. In some instances, the universe can be a relational universe that is a graphical representation of dimensions and objects that allow users to analyze data. A relational universe can be created on top of a relational databases such as an SQL Server, ORACLE, or other data source providers.

In some instances, a query can be defined in a unified manner, and can be transformed to sub-queries that can be relevant for each individual data source that is queried. The query can include query statements directed to different data sources, where the different queries can be connected with data operators. Based on the query defined in the unified manner, sub-queries can generated as tailored to the functionality available for querying at the data source (and relevant for the data source type respectively). A sub-query can be defined to query for data from a data source based on obtained metadata for the underlying objects stored at the data source. The definition of the sub-query can be performed at a data access component corresponding to a data source to generate a query statement, where the data access component is configured to connect with the data source and execute the sub-query to obtain data as a tabular record set that can be processed based on the original query.

FIG. 1 is a block diagram depicting an example computer-implemented system 100 that can execute implementations of the present disclosure in accordance with implementations of the present disclosure. In the depicted example, the example system 100 includes a client device 102, a client device 104, a network 110, a cloud environment 106, and a cloud environment 108. The cloud environment 106 may include one or more server devices and databases (for example, processors, memory). In the depicted example, a user 114 interacts with the client device 102, and a user 116 interacts with the client device 104.

In some examples, the client device 102 and/or the client device 104 can communicate with the cloud environment 106 and/or cloud environment 108 over the network 110. The client device 102 can include any appropriate type of computing device, for example, a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 110 can include a large computer network, such as a local area network (LAN), a wide area network (WAN), the Internet, a cellular network, a telephone network (for example, PSTN), or an appropriate combination thereof connecting any number of communication devices, mobile computing devices, fixed computing devices and server systems.

In some implementations, the cloud environment 106 includes at least one server and at least one data store 120. In the example of FIG. 1, the cloud environment 106 is intended to represent various forms of servers including, but not limited to, a web server, an application server, a proxy server, a network server, and/or a server pool. In general, server systems accept requests for application services and provide such services to any number of client devices (for example, the client device 102 over the network 110).

In accordance with implementations of the present disclosure, and as noted above, the cloud environment 106 can host applications and databases running on the host infrastructure. In some instances, the cloud environment 106 can include multiple cluster nodes that can represent physical or virtual machines that can represent web node clusters. A hosted application and/or service can run on virtual machines (VMs) hosted on cloud infrastructure.

In some instances, the cloud environment 106 and/or the cloud environment 108 can provide infrastructure for running a web server platform for generation of WebI reports in accordance with the present disclosure.

Figure 2:
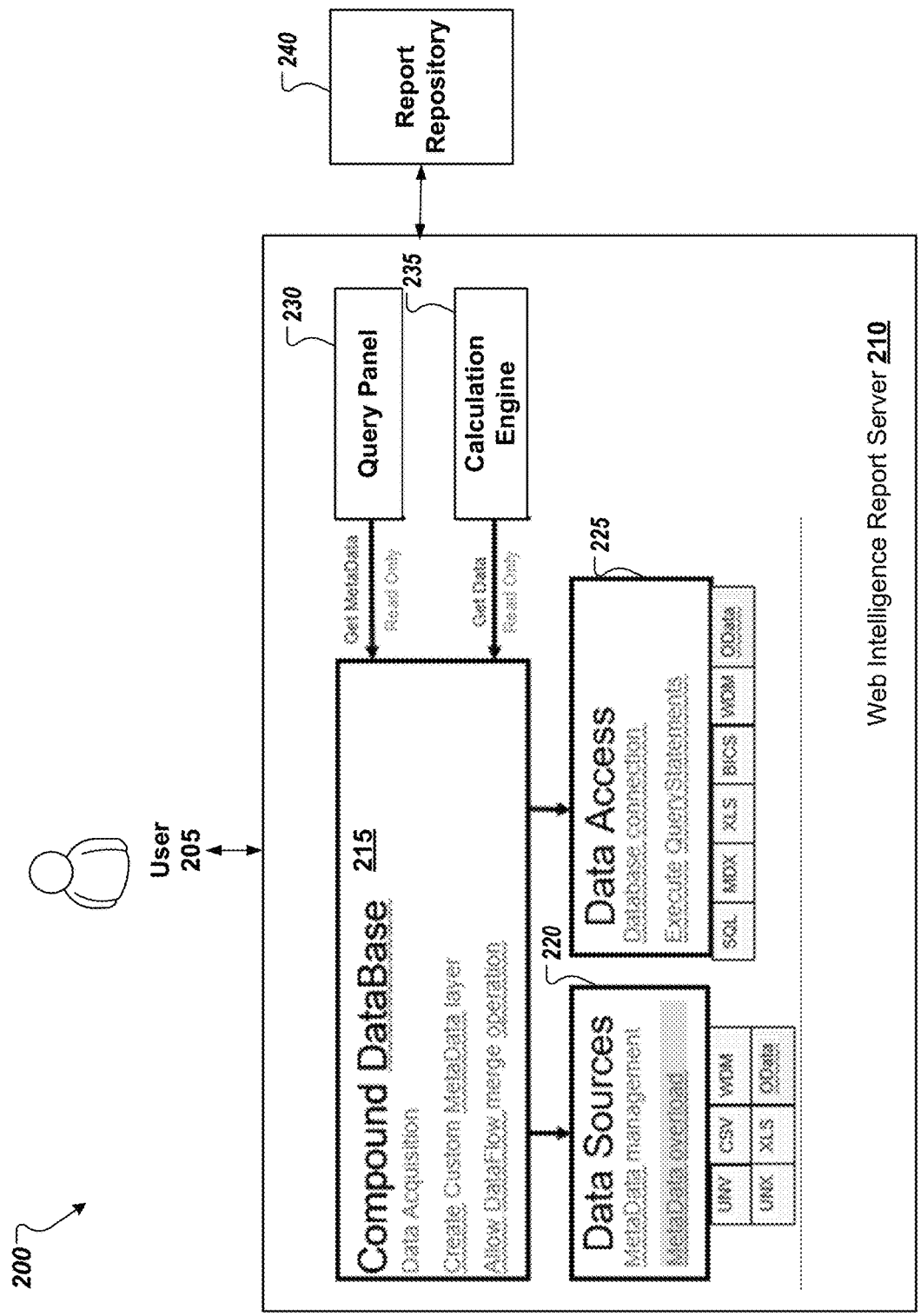
FIG. 2 is a block diagram of an example computing environment, including a web intelligence report server that supports generation of web intelligence (WebI) reports based on data sources of different data source types in accordance with implementations of the present disclosure.

FIG. 2 is a block diagram of an example computing environment 200, including a web intelligence report server that supports generation of web intelligence reports based on data sources of different data source types in accordance with implementations of the present disclosure.

In some instances, a web intelligence report server 210 is provided to facilitate execution of queries for generating reports. The web intelligence report server 210 received requests for reports, for example, based on user input from a user 205 or through a software application or a device (not shown) communicatively coupled to the web intelligence report server 210.

In some instances, the web intelligence report server 210 provides a query panel 230 that can be used to receive input (for example, from the user 205) to query data from different data sources. In some instances, the query panel 230 can be instantiated to maintain metadata for data objects stored at data sources 220, where data from the data sources can be extracted through respective data access components 225. In some instances, each data source can be associated with a data access component that is configured to generate query statement and execute these query statements at the data source in relation to received request for reports.

In some instances, a query of a unified format can be generated at the query panel 230 for a query request defining a data model for a report to be generated based on data from one or more data sources from the data sources 220.

The query definition at the query panel 230 can be performed based on a definition of objects and their properties at a compound database 215 that integrates access to the different data source. The query panel 230 obtains metadata from the data sources 220 through the compound database 215, where the query panel 230 enables generation of queries in a unified manner that is agnostic to the data source type that is to be queried for a report. The generated query can be parsed, and one or more sub-queries can be generated based on the original query. In some instances, the sub-queries can be generated as part of a tree data structure for the initial query. The tree structure can include data operators between different branches matching different subqueries. The tree structure associates the results from different queries based on the data operators that are to be performed according to reading the results from the sub-queries from the tree to obtain the query report end-result.

In some instances, a sub-query definition for each separate data source can be defined and executed to enable data manipulation over data sources of different source types in a unified manner. In some instances, if a query for a report includes data manipulations that are not supported by the queried data source, the query can be transformed to match the type of data source and to obtain relevant data from the data source based on the available querying techniques supported by the data source, where the obtained data can be manipulated to provide the query result. In such way, query definition can be agnostic to the type of the data source that is queried, and the data can still be maintained in various data sources of different data source types. Such configuration supports a smooth execution of queries that are easy to defined and flexible to integrate data of various sources while supporting a wide spectrum of capabilities.

In some instances, a request for a report can be based on two data sources of different data types—CSV file and an OData document, where the query for executing the report can be generated in a unified data source query format and send to the two data sources. In those instances, the two data sources can be configured to process the unified data source query and execute it on the particular data source type relevant to the respective data source to provide data for the report generation. Depending on the request for the report and the underlying data model and associated data manipulations for the data, it can be determined that one of the data sources, for example, the CSV file, does not support a query execution capabilities, for example, filtering. Thus, the query as initially defined cannot be directly executed at the CSV file. Based on exposed metadata for the CSV file as a data source, through the compound database 215, a data access component for the CSV file can execute a query statement to obtain data from the CSV file that is usable for generating the report as if the CSV file was supporting the filtering operation. The data access component can be implemented with an interface of a driver that can transform the initial query to a sub-query that reflects a data source dictionary of the CSV file. The data access component can be provided with overload definitions for properties of the objects at the CSV file that can support execution of a query based on the received request.

In some instances, the different query execution capabilities for data manipulation that can be supported by the query panel 230 can include selection, filtering, aggregation, name changes, among other example data manipulation operations. In some instances, such data manipulations can be associated with data calculations that can be executed by a calculation engine connected to the query panel. The provided query panel 230 can be used to generate reports that can be stored at a report repository 240 associated with the web intelligence report server 210.

In some instances, the compound database 215 can obtain metadata from the data sources 220 and provide it to the query panel 230 through the compound database 215. The compound database 215 can receive requests for executing queries and performing data acquisition, where the data acquisition can be based on a custom metadata layer that is associated with a respective data source and for data manipulations that are not natively supported by the type of the data source.

In some instances, the queries executed at the web intelligence report server 210 can include aggregation operations, where a calculation engine 235 can be instantiated to obtain the data from the compound database 215 after the data acquisition and to perform operations based on result data obtained from one or multiple sub-queries generated based on transformations of the initial query and tailored to the data source type that is queried.

The system includes a WebI report server 210 that stores information into a repository (for example, a report repository 240) via a repository proxy g., associated with a Business Objects Enterprise ("BOE") connection). The WebI report server 210, which may be associated with the Common Object Request Broker Architecture ("CORBA"), includes a WebI information software development kit (SDK) that may manage sessions and states, manage security, manage resources access (thru the repot proxy), audit functionality, etc. An information engine SDK application programming interface (API) may, for example, manage calls for a compound database 215 while a server SDK API manages calls for reporting needs (for example, to redirect to a report engine). The compound database 215 may be associated with an in-memory database and manage and store all data and metadata available and have an API to create/update/delete a data provider, create/update/delete a user object, get a document dictionary (all objects available), refresh data providers, etc. The compound database 215 may contain, for example, a data providers definition (a data provider is defined by a query on a data source). The compound database 215 may also provide a local storage for data flows provided by a query execution. Moreover, user objects (additional metadata definition) might include variables, synchronized dimensions, grouping, geographic enrichments, time enrichments, etc. specific implementation for each type of data source 220 (UNY, UNX, XLS, FreeHand SQL, etc.), create queries, and generate an executable statement. A data sources API may be associated with query generation to provide data source metadata (all available objects), provide a List Of Values ("LOVs") for objects, allow parameters resolution (variables/prompts), provide an executable query statement for an associated data access 225 layer, etc. The data access 225 may include an abstract layer with a specific implementation for each type of data layer (SQL, BICS, MDX, XLS files, etc.) and/or provide an executable query statement and return result dataflows. The data access 225 might be associated with an API, query execution, describe results, iterate on results, etc.

A report engine may generate paginated reports in different formats (for example, XLS, PDF, text, etc.). An API of the report engine may update a report structure and get pages. The report engine storage may contain a report specification (defines all reports definition). The report server may further include query facilities to provide API according a client's needs to perform queries on top of the compound database, check queries integrity (use only objects available existing in compound database dictionary), translate a client's request in a "calculator" internal language, and provide iterator on a query result. APIs available in connection with the query facilities may include a custom API for report engine needs (for example, to define several queries (one query/bloc in the report), retrieve results with a random access) and a custom API for analytics needs (for example, a simple API to define a query and retrieve results as an array). Uses of the query facilities may include metadata provided by compound database dictionary. The report server may further include a calculation engine 235 to execute calculation plans on top of data stored in compound database. An API associated with the calculation engine 235 may include a custom API dedicated for query facilities (for example, to allow for the creation, optimization, and/or execution of calculation plans). The calculation engine 235 may be used for data flows provided by the compound database 215 (for example, roots for calculation plan).

Figure 3:
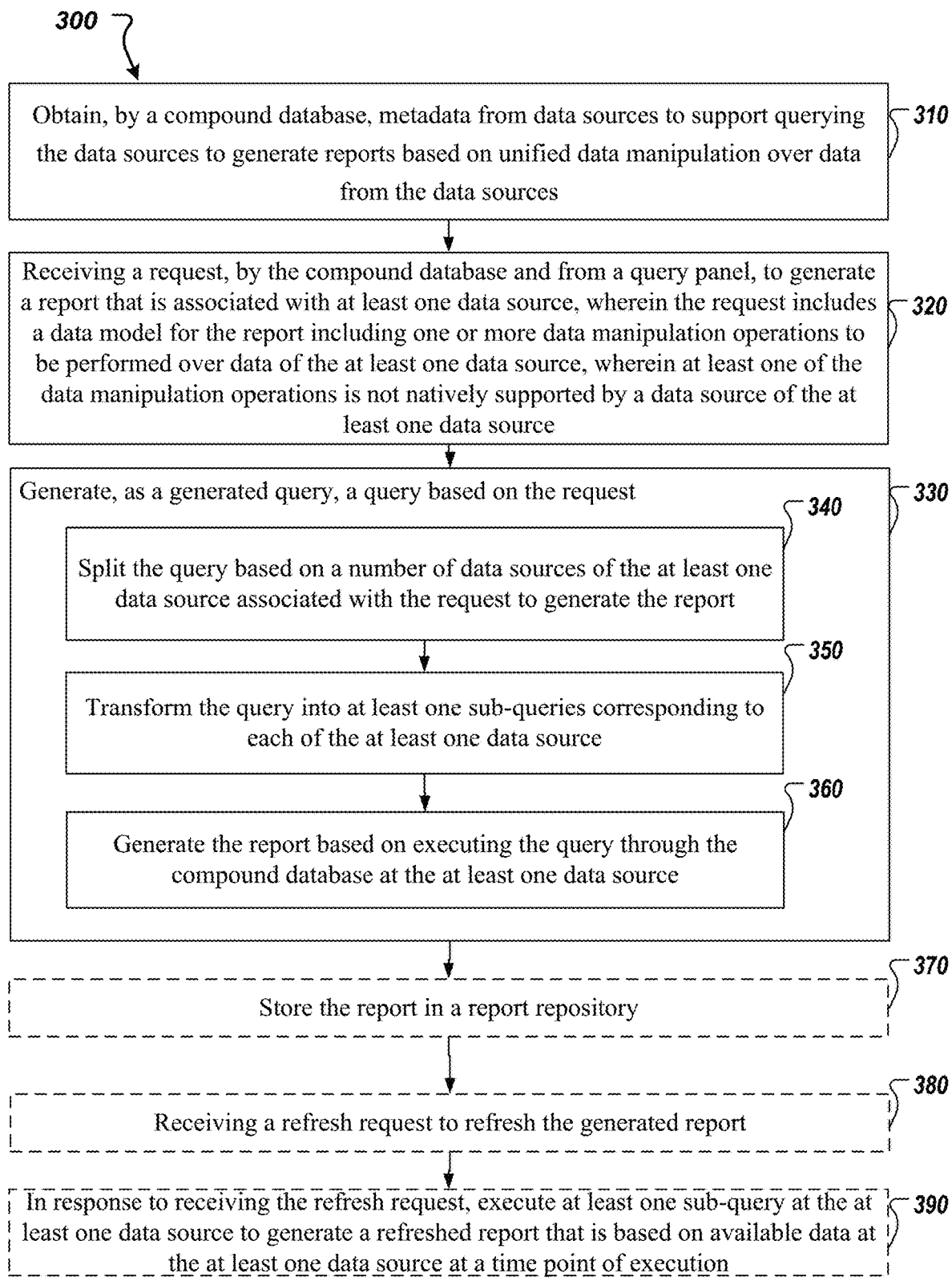
FIG. 3 is a flow diagram of a method for generating reports based on data from different data sources of different data source types in accordance with implementations of the present disclosure.

FIG. 3 is a flow diagram of a method 300 for generating reports based on data from different data sources of different data source types in accordance with implementations of the present disclosure. In some instances, the method 300 can be executed at the example computing environment 200 of FIG. 2.

At 310, metadata from data sources is obtained by a compound database, for example, the compound database 215 of FIG. 2. The metadata is obtained at the compound database 215 to support querying the data sources, for example, through a query panel connected to the compound database. The metadata can support generation of reports based on unified data manipulation over data from the data sources, where each data source of the data sources is of a respective data source type and associated with a different respective set of query execution capabilities from a plurality of query execution capabilities.

In some instances, the data sources include one or more of an EXCEL file, a text file, a CSV file, an OData data source, a universe, and a relational database.

In some instances, metadata can be obtained from each of the data sources for the data objects stored at the data sources, where the metadata for the objects can be mapped to overload definitions for objection parameters of the data source objects. Thus, when a query is defined, the query can be transferred to a data access component associated with each respective data source that is associated with the query and an execution plan for the query can be defined based on metadata abstraction and data acquisition according to defined data connections with the data source. In some instances, the data sources of a given type are associated with a set of query execution capabilities. In some instances, a query execution capability for a data source defines one or more data manipulation operations that are supported by the data source and a respective data source type.

At 320, a request is received from a query panel by the compound database. The request is to generate a report that is associated with at least one data source, where the request includes a data model for the report including one or more data manipulation operations to be performed over data of the at least one data source. In some instances, at least one of the data manipulation operations associated with the request is not natively supported by a data source of the at least one data source.

At 330, a query is generated, as a generated query, on the request. The query is generated to obtain data from the at least one data source thus to generate the report. The generation of the query includes that at 340, the query is split into sub-tasks related to the at least one data source associated with the report. The splitting is based on a number of data sources of the at least one data source associated with the request to generate the report. For example, if a query is associated with two data sources of different source type, the query can be split into two sub-task that can be transformed into sub-queries directed separately towards the different data sources.

At 350, the query is transformed into at least one sub-queries corresponding to each of the at least one data source. A sub-query can be defined based on a data source type of a respective data source and a data manipulation operation that is included in the request. At least one data manipulation operations of the one or more data manipulation operations included in the request is not-supported by a data source of the at least one data source associated with the request to generate the report.

In some instances, the query is generated as a tree of queries combined with operators to obtain the data from the at least one data source. A query from the tree of queries can be transformed to a sub-query, where the transformation is based on the data source type. In this way, the query from the tree of queries can be transformed in a combination of queries that are executed according to a query execution plan tailored to the data source type of the underlying data source that is queried. In some instances, a first sub-query corresponding to a query from the tree of queries can be generated based on transforming the query based on a specification for transforming at least a portion of the query to query for according to the data source type of the first data source.

At 360, the report can be generated based on executing the query through the compound database at the at least one data source. In some instances, executing the query through the compound database can include executing a calculation plan on top of the data from the at least one data source based on transmitting get data messages from a calculation engine to the compound database to aggregate and merge the data from the at least one data source according to a data flow merge operation.

At 370, the report is stored in a report repository, for example, such as the report repository 240 of FIG. 2.

At 380, a refresh request to refresh the generated report is received.

At 390, in response to receiving the refresh request, executing at least one sub-query at the at least one data source to generate a refreshed report that is based on available data at the at least one data source at a time point of execution. In some instances, the execution of the refresh operation over the report is performed to obtain data that has been newly added into one of the data sources.

Figure 4:
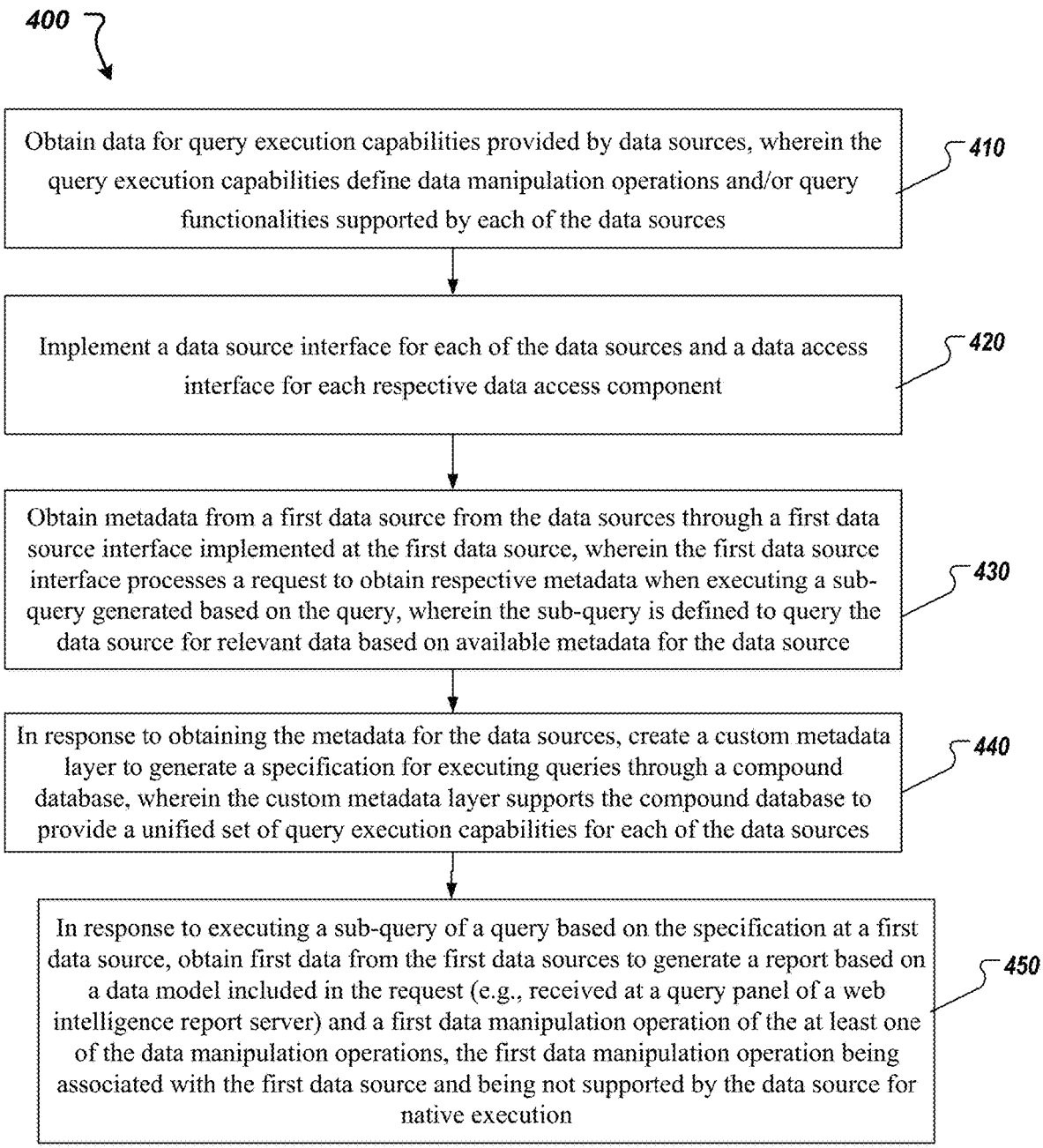
FIG. 4 is a flow diagram of a method for configuring data sources of different data source types to be accessible and to provide data that is usable to generate reports based on data manipulations that are not natively supported by at least one of the data sources in accordance with implementations of the present disclosure.

FIG. 4 is a flow diagram of a method 400 for configuring data sources of different data source types to be accessible and to provide data that is usable to generate reports based on data manipulations that are not natively supported by at least one of the data sources. The method 400 can be executed at the computing environment 200 of FIG. 2. The method 400 can be executed as part of preparatory steps to provide a query panel at a report server that can receive query requests that are generated in an unified format for execution at data sources of various data source types. The generated queries can be transformed into queries that are tailored to the specific and capabilities supported by the data source. In some instances, a query can be transformed into multiple queries, where each query is executed according to a query execution plan defined by an interface implemented for the data source. The query panel can communicate with the data source to obtain metadata about the data sources and to provide requests for queries through a compound database, for example, as the compound database 215 of FIG. 2. The compound database can direct communication to each of the data sources through an interface at a data access component that is configured to translate the query (or a portion thereof) to an executable request at the data source, where obtained data through the execution can be provided through the interface to a compound database.

At 410, data for query execution capabilities provided by each of the data sources is obtained. The query execution capabilities define data manipulation operations and/or query functionalities supported by each of the data sources.

In some instances, each of the data sources is associated with a respective data access component for managing connections, access rights, and generation of sub-queries matching a respective data source type of a data source.

At 420, a data source interface is implemented for each of the data sources. A data access interface is implemented for each respective data access component. In some instances, the data source interfaces are implemented to provide the metadata that is obtained by the compound database and is usable to create a custom metadata layer at the compound database that is configured to communicate with a specification generation component of the data access interface to define a sub-query for executing at the data source.

In some instances, a first data access component includes logic for defining a query statement for execution at a first, corresponding data source. The logic at the first data access component is for transforming the generated query to a sub-query that matches the request for the report and the data model of the report. Based on executing the sub-query at the first, corresponding data source through the first data access component, first data is obtained. The obtaining of the first data allows for executing a data manipulation operation of the at least one data manipulation operations that is not natively supported by the first data source.

At 430, metadata from a first data source from the data sources is obtained through a first data interface implemented at the first data source. In some instances, the first data source interface processes a request to obtain respective metadata when executing a sub-query generated based on the query. In some instances, the sub-query can be defined to query the data source for relevant data based on available metadata for the data source.

At 440, in response to obtaining the metadata for the data sources, a custom metadata layer is created to generate a specification for executing queries through the compound database. The custom metadata layer supports the compound database to provide a unified set of query execution capabilities for each of the data sources.

At 450, in response to executing a sub-query of a query based on the specification at the first data source, obtaining first data from the first data sources to generate the report based on a data model included in the request for a report and a first data manipulation operation of the at least one of the data manipulation operations. The request for the report can be received at a query panel, for example, the query panel 230 of FIG. 2. The first data manipulation operation is associated with the first data source and is not supported by the data source for native execution.

Figure 5:
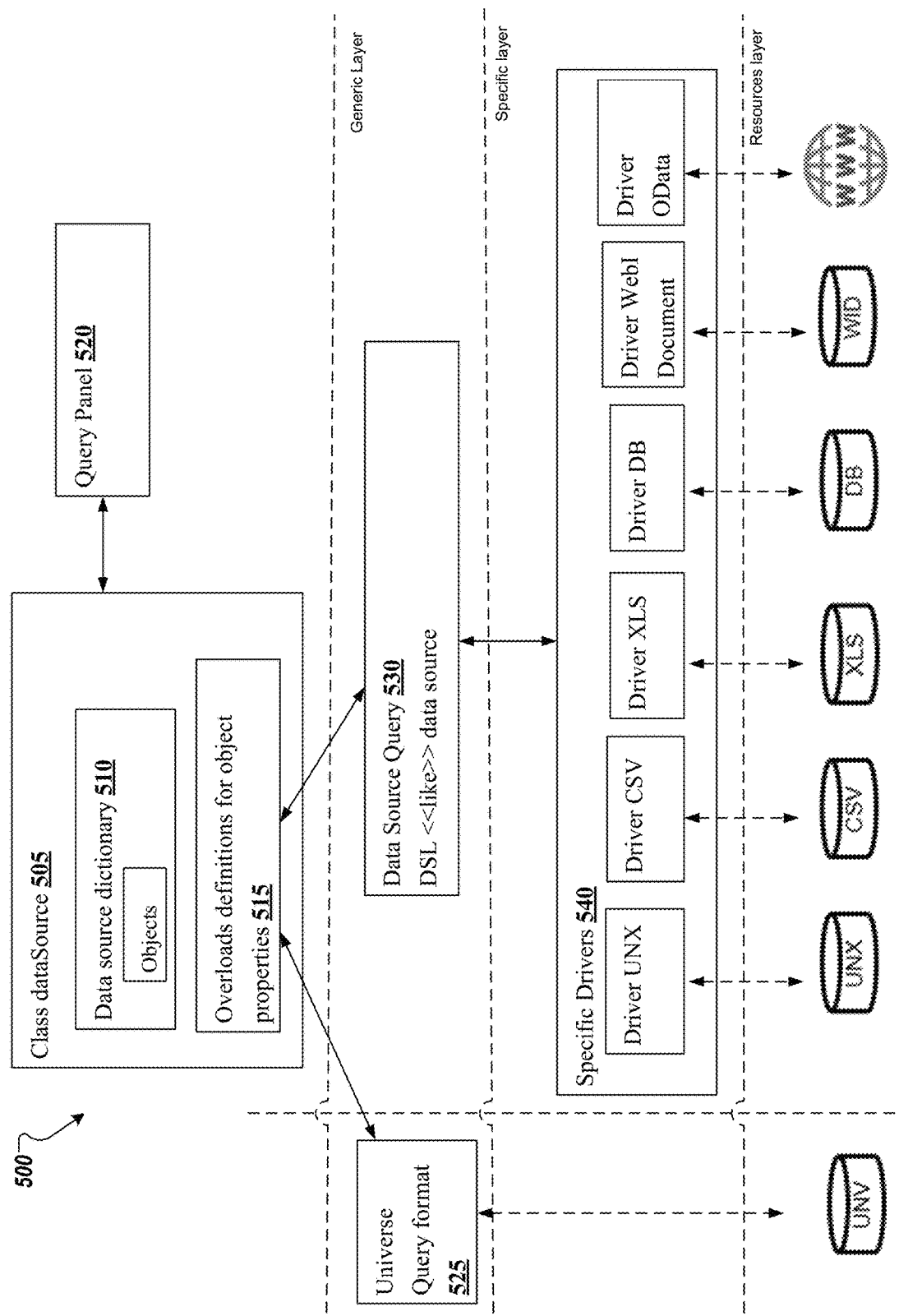
FIG. 5 is a block diagram for an internal data source access architecture that supports generation of reports based on one or more data sources of different data source type in a unified query approach in accordance with implementations of the present disclosure.

FIG. 5 is a block diagram for an internal data source access architecture that supports generation of reports based on one or more data sources of different data source type in a unified query approach in accordance with implementations of the present disclosure.

In some instances, a computing environment for executing queries to generate reports that can be substantially similar to the computing environment 200 of FIG. 2 can be implemented in a computing architecture where a resource layer includes multiple data sources of various types (for example, provided by different data providers and according to different data model specification) can be connected through a specific layer that includes specific driver 540 to a query panel 520 where queries for data from data objects for one or more of the data sources are defined. The specific drivers 540 are configured to facilitate data manipulations over data from the various data sources in a unified manner that is agnostic to the data manipulation and/or query execution capabilities of the technology stack of the resources at the resource layer.

In some instances, a query panel 520 can be implemented to receive queries that are generated based on an exposed interface that allows for defining query statements with objects of a data source from the resource layer. In some instances, a query can be defined based on a definition of a data source class object "dataSource" 505 that includes a data source dictionary 510 defining objects that can be used for defining a query. For example, an object can be an employee, where the object can have multiple data object properties, such as, date of birth, salary, department, employee identifier, manager, role, among other examples. Data about objects, such as employees, can be stored at various data sources, where data from those sources can be invoked and used for generating a report that is build based on data queries from all (or some of the data sources). If the query is built in a unified query format that is agnostic to the technology stack and supported query capabilities of the data sources, the query needs to be transformed into a translated query that adjusts the query to match the query capabilities of a respective data source.

In some instances, when a query panel 520 receives a query, based on the class dataSource 505 definition, the query can be represented as a data source query 530 or in a universe query format 525. For example, the query definition may be determined based on the type of data source that is to be queries. The queries directed to a universe data source can be defined in the universe query format 525, and queries directed to data sources such as UNIX data source, CSV file, XLS file, relational database, WebI document file, or OData file, among other example data sources of different source types.

In some instances, query execution capabilities of the data sources that are to be queried can be evaluated, and a set of query capabilities that includes each set of query capabilities supported by each data source can be defined. Based on such identification of the set of query capabilities that includes all supported capabilities by at least one data source, a broader definition of query capability functionality can be defined to be applied for all of the data source when queried. A specific driver can be defined for each data source to support the execution of a query that can include requests relying on query capabilities that are not natively supported by the respective data source. The execution of the query and the smooth integration into a result report can be supported by the specific drivers that rely on extracted metadata from the data sources and definition of overload definitions for object properties 515 at the class dataSource 505 to unify the representation of objects even if they are stored in data sources that are of different source type.

In some instances, the overload definitions for object properties 515 can be generated based on obtained metadata from the data sources through data access interfaces of the data sources to define a metadata layer that can be used as a specification for executing queries at different data sources based on a unified query definition agnostic to the type of the data source.

In accordance with implementations of the present disclosure, the implementation of specific drivers 540 for different data sources of different data source types support execution of queries that are defined in a unified manner by the user. Thus, users are provided with easy yet efficient tools to execute queries and access data of various types with a single report request. Further, the web report server that implements the query execution executes queries efficiently based on the implemented logic at the drivers.

Figure 6:
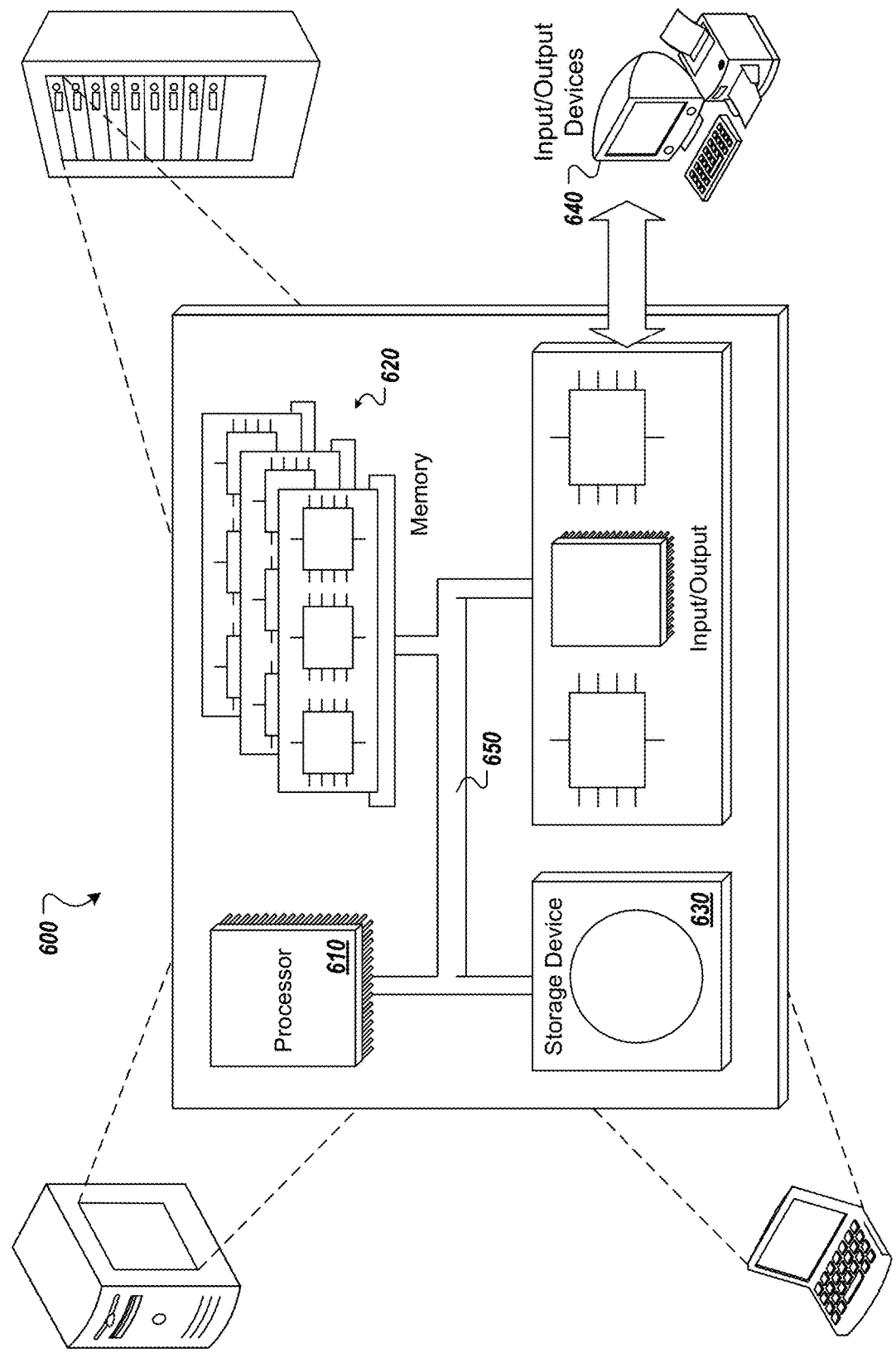
FIG. 6 is a schematic diagram of an example computer system that can be used to execute implementations of the present disclosure.

FIG. 6 is a schematic diagram of an example computer system 600 that can be used to execute implementations of the present disclosure. For example, the computer system 600 may be included in any or all of the server components discussed herein. The computer system 600 includes a processor 610, a memory 620, a storage device 630, and an input/output device 640. The components 610, 620, 630, and 640 are interconnected using a system bus 650. The processor 610 is capable of processing instructions for execution within the computer system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the computer system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the computer system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or combinations of them. The apparatus can be implemented in a computer program product tangibly embodied in an information carrier (for example, in a machine-readable storage device, for execution by a programmable processor), and method operations can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or another unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory, or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a cathode ray tube (CRT) or liquid crystal display (LCD) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship between client and server arises by virtue of computer programs running on the respective computers and having a client-server relationship with each other.

In addition, the logic flows depicted in the figures do not require the particular order shown, or sequential order, to achieve desirable results. In addition, other operations may be provided, or operations may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

In view of the above described implementations of subject matter, this application discloses the following list of examples, wherein one feature of an example in isolation or more than one feature of said example taken in combination and, optionally, in combination with one or more features of one or more further examples are further examples also falling within the disclosure of this application.

Examples

Although the present application is defined in the attached claims, it should be understood that the present invention can also be (alternatively) defined in accordance with the following examples:

Example 1. A computer-implemented method comprising:
obtaining, by a compound database, metadata from data sources to support querying the data sources to generate reports based on unified data manipulation over data from the data sources, wherein each data source of the data sources is of a respective data source type and associated with a different respective set of query execution capabilities from a plurality of query execution capabilities, wherein a query execution capability for a data source defines one or more data manipulation operations that are supported by the data source and a respective data source type;

receiving a request, by the compound database and from a query panel, to generate a report that is associated with at least one data source, wherein the request includes a data model for the report including one or more data manipulation operations to be performed over data of the at least one data source, wherein at least one of the data manipulation operations is not natively supported by a data source of the at least one data source; and generating, as a generated query, a query based on the request to obtain data from the at least one data source to generate the report, wherein generating the query comprises:

splitting the query based on a number of data sources of the at least one data source associated with the request to generate the report;

transforming the query into at least one sub-queries corresponding to each of the at least one data source, wherein a sub-query is defined based on a data source type of a respective data source and a data manipulation operation that is included in the request, wherein at least one data manipulation operations of the one or more data manipulation operations included in the request is not-supported by a data source of the at least one data source associated with the request to generate the report; and generating the report based on executing the query through the compound database at the at least one data source.

Example 2. The computer-implemented method of Example 1, wherein obtaining metadata from data sources comprises:

obtaining the metadata based on data source interfaces implemented at the data sources and data access interfaces implemented at data access components, wherein a data access component connects a respective data source to the compound database and defines an execution of a sub-query of the at least one sub-queries according to a specification for transforming the query for a respective data source type matching the data source type of a respective data source.

Example 3. The computer-implemented method of Example 1 or 2, wherein obtaining metadata from data sources comprises:

obtaining metadata from a data source from the data sources through an interface implemented at the data source, wherein the interface processes a request to obtain respective metadata when executing a sub-query generated based on the query, wherein the sub-query is defined to query the data source for relevant data based on available metadata for the data source.

Example 4. The computer-implemented method of any of the preceding Examples, wherein each of the data sources is associated with a respective data access component for managing connections, access rights, and generation of sub-queries matching a respective data source type of a data source, and wherein the method comprising:

implementing a data source interface for each of the data sources and a data access interface for each respective data access component, wherein data source interfaces are implemented to provide the metadata that is obtained by the compound database and is usable to create a custom metadata layer at the compound database that is configured to communicate with a specification generation component of the data access interface to define a sub-query for executing at the data source.

Example 5. The computer-implemented method of any of the preceding Examples, the method comprising:

in response to obtaining metadata from data sources, creating a custom metadata layer to generate a specification for executing queries through the compound database, wherein the custom metadata layer supports the compound database to provide a unified set of query execution capabilities for each of the data sources; and in response to executing a sub-query of the query based on the specification at a first data source, obtaining first data from the first data sources to generate the report based on the data model included in the request to generate the report and a first data manipulation operation of the at least one of the data manipulation operations, the first data manipulation operation being associated with the first data source and being not supported by the data source for native execution.

Example 6. The computer-implemented method of any of the preceding Examples, wherein each of the data sources is associated with a respective data access component for managing connections and access rights, wherein a first data access component includes logic for defining a query statement for execution at a first, corresponding data source, wherein the logic at the first data access component is for transforming the generated query to a sub-query that matches the request for the report and the data model of the report, and wherein based on executing the sub-query at the first, corresponding data source through the first data access component, first data is obtained that allows for executing a data manipulation operation of the at least one data manipulation operations that is not natively supported by the first, corresponding data source.

Example 7. The computer-implemented method of any of the preceding Examples, wherein the query is generated as a tree of queries combined with operators to obtain the data from the at least one data source, and wherein a query from the tree of queries is transformed to a sub-query.

Example 8. The computer-implemented method of any of the preceding Examples, wherein a first sub-query of the at least one sub-queries that is associated with a first data source is generated based on transforming the query based on a specification for transforming at least a portion of the query according to the data source type of the first data source.

Example 9. The computer-implemented method of any of the preceding Examples, wherein executing the query through the compound database comprises:

executing a calculation plan on top of the data from the at least one data source based on transmitting get data messages from a calculation engine to the compound database to aggregate and merge the data from the at least one data source according to a data flow merge operation.

Example 10. The computer-implemented method of any of the preceding Examples, wherein the compound database is coupled to the data sources and is configured to maintain data source connections to the data sources.

Example 11. The computer-implemented method of any of the preceding Examples, comprising:

obtaining data for query execution capabilities provided by each of the data sources, wherein the query execution capabilities define data manipulation operations and/or query functionalities supported by each of the data sources.

Example 12. The computer-implemented method of any of the preceding Examples, comprising:
storing the report in a report repository.

Example 13. The computer-implemented method of any of the preceding Examples, wherein the data sources comprise one or more of an EXCEL file, a text file, a comma-separated value (CSV) file, an open data protocol (OData) data source, a universe, and a relational database.

Example 14. The computer-implemented method of any of the preceding Examples, comprising:
receiving a refresh request to refresh the generated report; and
in response to receiving the refresh request, executing at least one sub-query at the at least one data source to generate a refreshed report that is based on available data at the at least one data source at a time point of execution.

Example 15. A system comprising:
one or more processors; and
one or more computer-readable memories coupled to the one or more processors and having instructions stored thereon that are executable by the one or more processors to perform the method of any of Examples 1 to 14.

Example 16: A non-transitory, computer-readable medium coupled to one or more processors and having instructions stored thereon which, when executed by the one or more processors, cause the one or more processors to perform the method of any of Examples 1 to 14.

What is claimed is:

1. A computer-implemented method comprising:
obtaining, by a compound database, metadata from data sources to support querying the data sources to generate reports based on unified data manipulation over data from the data sources, wherein each data source of the data sources is of a respective data source type and associated with a different respective set of query execution capabilities from a plurality of query execution capabilities, wherein a query execution capability for a given data source defines data manipulation operations that are supported by the given data source and a respective data source type;
receiving a request, by the compound database and from a query panel, to generate a report that is associated with at least one data source, wherein the request includes a data model for the report and one or more data manipulation operations to be performed over data of the at least one data source, wherein at least one of the one or more data manipulation operations is not natively supported by a first data source of the at least one data source and a data source type of the first data source; and
generating, as a generated query, a query based on the request to obtain data from the at least one data source to generate the report according to the data model, wherein generating the query comprises:
splitting the query based on a number of data sources of the at least one data source associated with the request to generate the report;
transforming the query into at least one sub-queries corresponding to each of the at least one data source, wherein a sub-query is defined based on the data source type of the first data source and a data manipulation operation that is included in the request and not natively supported by the first data source and the data source type; and
generating the report based on executing the query through the compound database at the at least one data source.

2. The computer-implemented method of claim 1, wherein obtaining metadata from data sources comprises:
obtaining the metadata based on data source interfaces implemented at the data sources and data access interfaces implemented at data access components,
wherein a data access component connects the first data source to the compound database and defines an execution of the sub-query of the at least one sub-queries according to a specification for transforming the query for the respective data source type of the first data source.

3. The computer-implemented method of claim 1, wherein obtaining metadata from data sources comprises:
obtaining metadata from a data source of the data sources through an interface implemented at the data source, wherein the interface processes a request to obtain respective metadata when executing a sub-query generated based on the query, wherein the sub-query is defined to query the data source for relevant data based on available metadata for the data source.

4. The computer-implemented method of claim 1, wherein each of the data sources is associated with a respective data access component for managing connections, access rights, and generation of sub-queries matching a respective data source type of a data source, and wherein the method comprising:
implementing, by the compound database, a data source interface for each of the data sources and a data access interface for each respective data access component, wherein data source interfaces are implemented to provide the metadata, wherein the data source interfaces create a custom metadata layer at the compound database that is configured to communicate with a specification generation component of each of the data access interfaces to support querying the data sources by defining sub-query for executing at the data sources.

5. The computer-implemented method of claim 1, the method comprising:
in response to obtaining the metadata from the data sources, creating a custom metadata layer to generate specifications for executing queries through the compound database, wherein the custom metadata layer supports the compound database to provide a unified set of query execution capabilities for each of the data sources; and
in response to executing the sub-query of the query based on a specification at the first data source, obtaining first data from the first data sources to generate the report.

6. The computer-implemented method of claim 1, wherein each of the data sources is associated with a respective data access component for managing connections and access rights, wherein a first data access component includes logic for defining a query statement for execution at the first data source as a corresponding data source, wherein the logic at the first data access component is for transforming the generated query to a sub-query that matches the request for the report and the data model of the report, and wherein based on executing the sub-query at the first, corresponding data source through the first data access component, first data is obtained that allows for executing a data manipulation operation of the at least one of the one or more data manipulation operations that is not natively supported by the first, corresponding data source.

7. The computer-implemented method of claim 1, wherein the query is generated as a tree of queries combined with operators to obtain the data from the at least one data source, and wherein a query from the tree of queries is transformed to a sub-query.

8. The computer-implemented method of claim 1, wherein the sub-query defined for the first data source is generated based on transforming the query based on a specification for transforming at least a portion of the query according to the data source type of the first data source.

9. The computer-implemented method of claim 1, wherein executing the query through the compound database comprises:
    executing a calculation plan on top of the data from the at least one data source based on transmitting get data messages from a calculation engine to the compound database to aggregate and merge the data from the at least one data source according to a data flow merge operation.

10. The computer-implemented method of claim 1, wherein the compound database is coupled to the data sources and is configured to maintain data source connections to the data sources.

11. The computer-implemented method of claim 1, comprising:
    obtaining data for query execution capabilities provided by each of the data sources, wherein the query execution capabilities define data manipulation operations and/or query functionalities supported by each of the data sources.

12. The computer-implemented method of claim 1, comprising:
    storing the report in a report repository.

13. The computer-implemented method of claim 1, wherein the data sources comprise one or more of an EXCEL file, a text file, a comma-separated value (CSV) file, an open data protocol (OData) data source, a universe, and a relational database.

14. The computer-implemented method of claim 1, comprising:
    receiving a refresh request to refresh the generated report; and
    in response to receiving the refresh request, executing at least one sub-query at the at least one data source to generate a refreshed report that is based on available data at the at least one data source at a time point of execution.

15. A system comprising:
    one or more processors; and
    one or more computer-readable memories coupled to the one or more processors and having instructions stored thereon that are executable by the one or more processors to perform operations comprising:
        obtaining, by a compound database, metadata from data sources to support querying the data sources to generate reports based on unified data manipulation over data from the data sources, wherein each data source of the data sources is of a respective data source type and associated with a different respective set of query execution capabilities from a plurality of query execution capabilities, wherein a query execution capability for a given data source defines data manipulation operations that are supported by the given data source and a respective data source type;
        receiving a request, by the compound database and from a query panel, to generate a report that is associated with at least one data source, wherein the request includes a data model for the report and one or more data manipulation operations to be performed over data of the at least one data source, wherein at least one of the one or more data manipulation operations is not natively supported by a first data source of the at least one data source and a data source type of the first data source; and
        generating, as a generated query, a query based on the request to obtain data from the at least one data source to generate the report according to the data model, wherein generating the query comprises:
            splitting the query based on a number of data sources of the at least one data source associated with the request to generate the report;
            transforming the query into at least one sub-queries corresponding to each of the at least one data source, wherein a sub-query is defined based on the data source type of the first data source and a data manipulation operation that is included in the request and not natively supported by the first data source and the data source type; and
            generating the report based on executing the query through the compound database at the at least one data source.

16. The system of claim 15, wherein obtaining metadata from data sources comprises:
    obtaining the metadata based on data source interfaces implemented at the data sources and data access interfaces implemented at data access components,
    wherein a data access component connects the first data source to the compound database and defines an execution of the sub-query of the at least one sub-queries according to a specification for transforming the query for the respective data source type of the first data source.

17. The system of claim 15, wherein obtaining metadata from data sources comprises:
    obtaining metadata from a data source of the data sources through an interface implemented at the data source, wherein the interface processes a request to obtain respective metadata when executing a sub-query generated based on the query, wherein the sub-query is defined to query the data source for relevant data based on available metadata for the data source.

18. A non-transitory, computer-readable medium coupled to one or more processors and having instructions stored thereon which, when executed by the one or more processors, cause the one or more processors to perform operations comprising:
    obtaining, by a compound database, metadata from data sources to support querying the data sources to generate reports based on unified data manipulation over data from the data sources, wherein each data source of the data sources is of a respective data source type and associated with a different respective set of query execution capabilities from a plurality of query execution capabilities, wherein a query execution capability for a given data source defines data manipulation operations that are supported by the given data source and a respective data source type;
    receiving a request, by the compound database and from a query panel, to generate a report that is associated with at least one data source, wherein the request includes a data model for the report and one or more data manipulation operations to be performed over data of the at least one data source, wherein at least one of the one or more data manipulation operations is not natively supported by a first data source of the at least one data source and a data source type of the first data source; and generating, as a generated query, a query based on the request to obtain data from the at least one data source to generate the report according to the data model, wherein generating the query comprises:
  splitting the query based on a number of data sources of the at least one data source associated with the request to generate the report;
  transforming the query into at least one sub-queries corresponding to each of the at least one data source, wherein a sub-query is defined based on the data source type of the first data source and a data manipulation operation that is included in the request and not natively supported by the first data source and the data source type; and
  generating the report based on executing the query through the compound database at the at least one data source.

19. The computer-readable medium of claim 18, wherein obtaining metadata from data sources comprises:
  obtaining the metadata based on data source interfaces implemented at the data sources and data access interfaces implemented at data access components,
  wherein a data access component connects the first data source to the compound database and defines an execution of the sub-query of the at least one sub-queries according to a specification for transforming the query for the respective data source type of the first data source.

20. The computer-readable medium of claim 18, wherein obtaining metadata from data sources comprises:
  obtaining metadata from a data source of the data sources through an interface implemented at the data source, wherein the interface processes a request to obtain respective metadata when executing a sub-query generated based on the query, wherein the sub-query is defined to query the data source for relevant data based on available metadata for the data source.

* * * * *